United States Patent [19]
Burny

[11] 3,829,988
[45] Aug. 20, 1974

[54] COCKPIT ASSEMBLY FOR FLIGHT SIMULATOR

[75] Inventor: Gilbert Burny, Marcinelle, Belgium

[73] Assignee: Ateliers de Constructions Electriques de Charleroi, Charleroi, Belgium

[22] Filed: May 25, 1972

[21] Appl. No.: 256,910

[30] Foreign Application Priority Data
May 27, 1971 Belgium .............................. 767723

[52] U.S. Cl. ................................................ 35/12 P
[51] Int. Cl. .............................................. G09b 9/08
[58] Field of Search ...... 35/12 P, 12 R, 12 K, 12 W; 272/1 C

[56] References Cited
UNITED STATES PATENTS

| | | | |
|---|---|---|---|
| 2,524,238 | 10/1950 | Soule .............................. | 35/12 P X |
| 2,637,449 | 5/1953 | Hamer ................................. | 214/1 |
| 2,687,580 | 8/1954 | Dehmel ............................. | 35/12 P |
| 2,930,144 | 3/1960 | Fogarty .............................. | 35/12 P |
| 3,281,962 | 11/1966 | Pancoe ............................... | 35/12 P |
| 3,451,146 | 6/1969 | Pancoe et al ....................... | 35/12 P |

*Primary Examiner*—Robert W. Michell
*Attorney, Agent, or Firm*—Raymond A. Robic; J. Ernest Kenney; Arthur Schwartz

[57] ABSTRACT

A simulated cockpit in a dive and pullout flight simulator having a pilot seating means supported for movements about a roll axis and a pitch axis only, the roll axis being located below the simulated cockpit and in a plane including the vertical plane of symmetry of the simulated cockpit, the pitch axis being located below the roll axis and located about one meter rearwardly and about two meters below the pilot seating means. The invention is characterized also in that the roll axis support means is in turn supported for movement with the simulated cockpit about the pitch axis during actuated movement of the cockpit during the dive and pullout flight simulation procedure.

5 Claims, 1 Drawing Figure

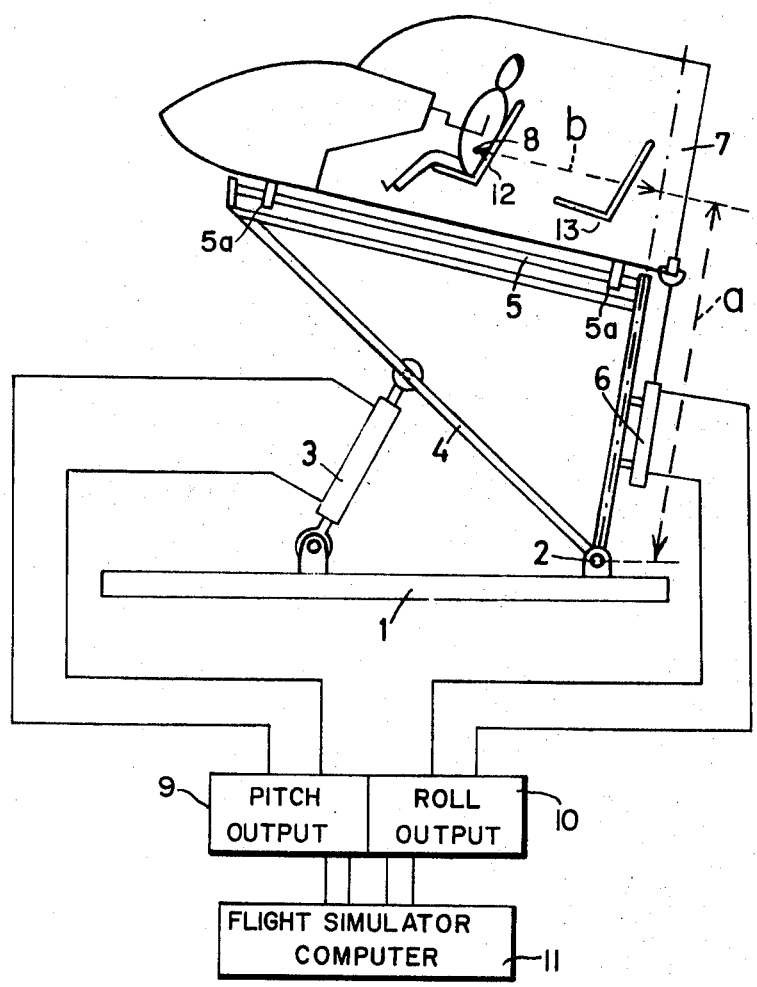

COCKPIT ASSEMBLY FOR FLIGHT SIMULATOR

The present invention relates to a support means for a cockpit assembly for a flight simulator.

There are cockpits for flight simulation hanging in mobile frames of which the movements are controlled by signals given by a computer of the flight simulation center. The mobile frame of such a cockpit can perform extremely complicated movements parallel to itself such as pitching, rolling, pulling-out and diving. To accomplish these motions, the frame must have a mechanical assembly comprising at least three axes of rotation and sliding connections, making the apparatus expensive.

An object of the invention is a training cockpit for a flight simulator which is supported so as to be capable of reproducing, with more simple means, the feeling felt by a pilot in a real airplane and to obtain this result by means of a mobile frame supported for movement about one pitch axis and one roll axis. The invention reproduces with great exactness the feeling felt in a power dive and pullout. The invention is characterized in that the cockpit is supported for movement about a roll axis which lies in a plane including the vertical plane of symmetry of the cockpit and oriented with respect thereto so as to correspond to the orientation of the actual cockpit of the aircraft being simulated with respect to the roll axis of such aircraft. The roll axis support is mounted in a support frame which is in turn mounted for movement about a horizontal pitch axis lying in a plane perpendicular to the roll axis, the pitch axis being located about one meter rearwardly and two meters below the center of gravity of the seated pilot.

The invention is now described in relation to a preferred embodiment illustrated in the appended drawing.

A base 1 anchored to the ground supports a pitch axle 2, a raising and lowering motor 3, and frame 4 pivotally mounted about the pitch axis 2, the frame being connected to the raising and lowering motor 3 for movement about the pitch axis. Frame 4 supports a roll axle 5 and a motor 6 provides the rolling motion. The roll motor 6 is connected to the frame at its lower end and is eccentrically connected to the cockpit at the upper end thereof in the manner of, for example, Soule U.S. Pat. No. 2,524,238. The roll axle 5 in turn supports the cockpit through pivots 5a attached to the cockpit for the seated student pilot whose center of gravity when seated is identified by the reference numeral 8. In order to reproduce the main feelings of flight with this simple apparatus, the location of the pitch and roll axes with respect to the simulated cockpit and the center of gravity of the student pilot is very important. The roll axis support 5 is located below the cockpit and the pilot, and the pitch axis is located below the cockpit roll axis support. The pitch axis 2 is preferably located between 1.6 and 2.8 meters below the center of gravity 8 of the seated pilot, and between .6 and 1.4 meters rearwardly from such location, as indicated respectively by arrows A and B in the drawing. These distances are measured orthogonally in the vertical, longitudinally extending plane including the roll axis 5 as shown in the drawing by the arrows A and B. The location of the pitch axle as here defined, need not correspond to the pitch axis of the real airplane, since this location contributes mostly to the production of dive and pull-out feelings. The location of the roll axle is selected, on the other hand, on the basis of the type of airplane that the apparatus must simulate. In view of the simplicity of the motions, the elements 2, 3, 4, 5 and 6, can be of very sturdy construction. The cockpit can be designed to accomodate four persons: the pilot and an instructor in front and two observers at the rear. While the pilot in seat 12 and the instructor in his seat (not visible in the drawing, but to the side of seat 12) will fully experience the pitch and roll feelings, the observers at the rear in seats 13 will feel them to a lesser degree. This constitutes a much appreciated pedagogical advantage.

The motors 3 and 6 may be electrical or fluidic or any combination thereof, and their specific construction does not form a part of this invention. The motors are controlled by suitable output means 9, 10 which are in turn under the control of a dive and pullout flight simulator computer 11 of the type known in flight simulator technology. For example, the computer could be similar to the computers shown in U.S. Pat. Nos. 3,363,331, 3,513,246, or 3,538,624.

I claim:
1. In an aircraft flight simulator, the improvement comprising
   a. a simulator cockpit;
   b. a support arrangement for said cockpit, said support arrangement comprising:
      1. a first pivotal support means for said cockpit for enabling the cockpit to rotate about a roll axis;
      2. a second pivotal support means for the said cockpit for enabling the cockpit and said first pivotal support means to rotate as a unit about a pitch axis located below said cockpit and said first pivotal support means;
      3. a seat for a pilot trainee in said cockpit, said second pivotal support means being located below and to the rear of said seat a predetermined distance; and
      4. separate means for displacing said cockpit about said roll and pitch axes, whereby the sensations of dive and pullout flight regimes may be realistically simulated with respect to a pilot trainee in said seat.

2. The improvement in an aircraft flight simulator as recited in claim 1 wherein said predetermined distance is between 1.2 and 2.8 meters vertically below, and between 0.6 and 1.4 meters behind the position of the center of gravity of a pilot seated in said seat.

3. The improvement in an aircraft flight simulator as recited in claim 1 wherein said first pivotal support means comprises a pair of longitudinally spaced pivots attached to the cockpit and located below the cockpit in a vertical longitudinal plane including the plane of symmetry of the said cockpit, and further wherein said means for displacing said cockpit about the roll axis is also mounted for movement as a unit with the cockpit about said pitch axis.

4. The improvement in an aircraft flight simulator as recited in claim 1 wherein said first pivotal support means comprises a pair of longitudinally spaced pivots attached to the cockpit, and an elongated axle member connecting said pivots, said axle member being connected to a frame pivotally attached to said second pivot support means.

5. The improvement in an aircraft flight simulator as recited in claim 4 wherein said cockpit includes seats for supporting observers rearwardly of the pilot and towards the vertical transverse plane include the pitch axis, and an instructor's seat to one side of the pilot seat.

* * * * *